Figure 1:
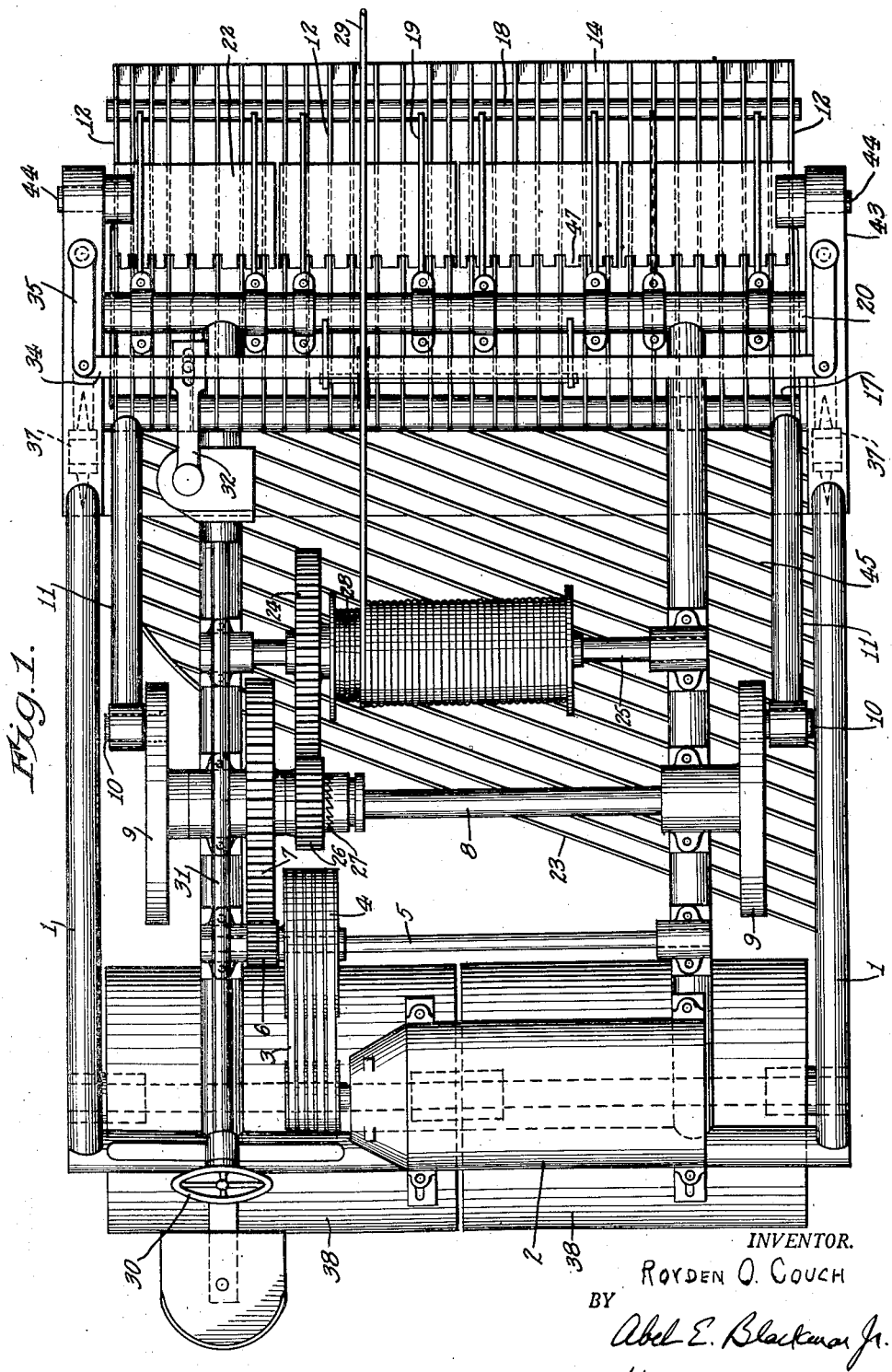

June 26, 1945.  R. O. COUCH  2,379,280

GRUBBING MACHINE

Filed March 18, 1944  2 Sheets-Sheet 1

INVENTOR.
ROYDEN O. COUCH
BY
Abel E. Blackman Jr.
his ATTORNEY

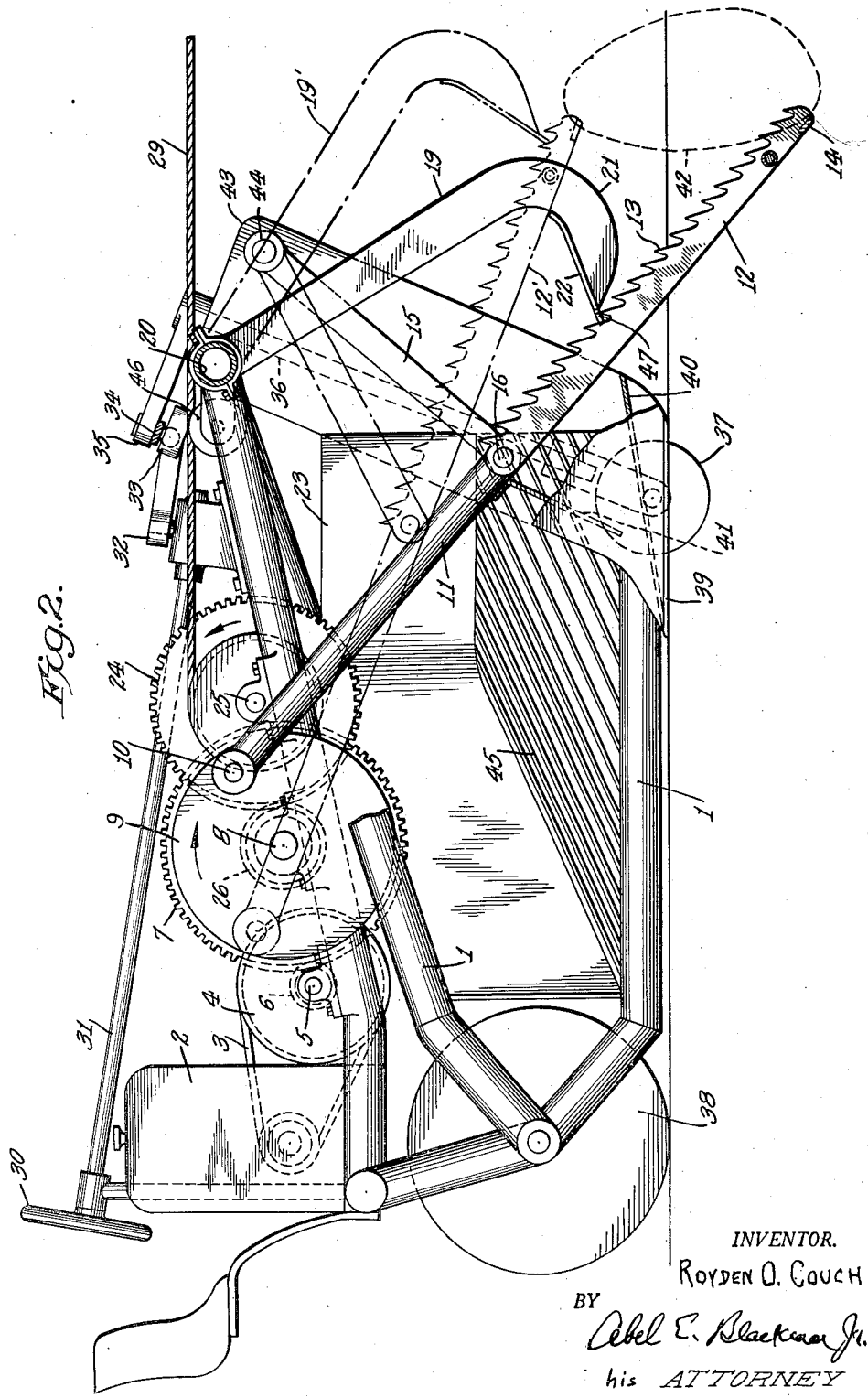

Patented June 26, 1945

2,379,280

UNITED STATES PATENT OFFICE 2,379,280

GRUBBING MACHINE

Royden O. Couch, Melbourne, Fla.

Application March 18, 1944, Serial No. 527,109

5 Claims. (Cl. 97—226.1)

My invention relates to a grubbing machine which is particularly useful on land covered with scrub growth, palmettoes, and similar growth.

In general, the object of my invention is to provide a machine that will, in a single operation, loosen and stir up the earth, take roots, etc., out of the ground, and leave the top soil on top and the ground level and ready for planting.

In its preferred form, the machine includes a source of power and gears and linkage whereby a series of arms, forming a digger rack, each arm of which is preferably toothed, is forced downward into the ground and then forward and upward, the teeth lifting the roots, etc., out of the ground, whence they are deposited on a grating or conveyor and deposited or carried clear of the machine. At the same time, the entire machine is moved forward by suitable means.

Among the advantages attained by my machine are the thorough stirring up of the ground and the removal of roots, etc., therefrom while at the same time leaving the top soil on top of the ground. The present usual method of clearing land of the types mentioned above is by deep plowing; this has the disadvantages of turning the top soil under with the result that the soil has to be built up by cultivation before it is suitable for growing crops; and of requiring removal of the roots from the soil by subsequent operations. The use of a machine embodying my invention minimizes or obviates the necessity of such cultivation and also reduces the labor required to remove the roots, etc. Other advantages of my invention will be readily apparent, from a reading of the following specification, to those familiar with the preparation, for planting, of ground of the kinds mentioned above.

Referring to the drawings—

Figure 1 is a plan view of the preferred form of a grubbing machine embodying my invention; and Fig. 2 is a side elevation thereof, certain parts being broken away to show the structure of the machine more clearly.

The numeral 1 indicates the frame of the machine, preferably tubular and constructed of pipe. Suitably mounted thereon is a source of power 2, such as a gasoline engine; the source of power is connected by a V-belt 3 or other suitable means to a wheel 4, mounted on the jack shaft 5. A pinion 6, carried by the jack shaft, drives gear 7, mounted on the shaft 8. Also mounted on this shaft are two discs 9, in which the crank pins 10 are set near the periphery. Journaled on each crank pin is a beam 11, to the lower or forward end of which, as hereinafter described, is rigidly attached the digger rack.

Each of the side frames 43, at the forward end of the machine, is provided with a stud 44 on each of which a link 15 is journaled. The other end of each link 15 is pivotally attached to one of the beams 11 at a point 16 approximately midway between the point of association of the latter with the crank pin and the lower end of the digger rack. As will be readily understood, the function of the links 15 is to limit and control the tangential motion of the beams 11. Thus the length of the links 15, the points at which their ends are attached, and the length of the radius about which the crank pins revolve will together fix the instantaneous positions and thus determine the motion of the digger rack.

The digger rack, rigidly affixed to the beams 11, as stated, is preferably composed of a series of spaced, parallel arms 12, and extends across substantially the entire width of the machine, constituting a rack of digging bars. Preferably each such bar or arm is provided, on its forward or leading edge, with a series of upstanding teeth 13, of the general form clearly shown in Fig. 2. The bottom of the rack, for some types of ground, may be provided with a transverse cutter-bar or cutting edge 14. The bars of the digger rack are held in position and stiffened by suitable means, such as cross-bars or tie-rods and spacers, as indicated at 17 and 18.

The means for disposing of the roots, etc., pulled out of the ground by the digger rack, include free-swinging baffles 19, mounted on the cross-pipe 20 which is carried by the side frames 43. Preferably, these baffles are made in sections—four being the number shown in the drawings—and are provided with rearwardly turned, finger-like ends 21, to which baffle plates 22 are attached. These plates may be notched on their lower or rearward edges so that projections 47 extend therefrom between the digger bars to about the depth of the teeth 13 thereon. As the roots are brought upward and backward by the teeth on the digger rack arms, they pass under the swinging baffles and are forced further backward with each stroke of the digger rack—the projections 47 on the baffle plates assisting in freeing any roots, etc., that may have become lodged in the teeth of the digger bars. The roots are thus deposited on the grating 45, preferably composed of a series of bars, which permits dirt and top soil carried with the roots to drop through to the surface of the ground. In the construction shown, the bars of the grating slope sharply to the right-hand side of the machine. A moldboard 23 surrounds the left and rear sides of the grating. This arrangement and the slope of the grating cooperate to deposit or discharge the roots at the right-hand side of the machine. The swinging baffles prevent the roots, etc., from being carried forward on the forward strokes of the digger rack.

The preferred means for imparting a steady, forward motion to the entire grubbing machine comprise a gear 24 mounted on shaft 25, the gear being driven by pinion 26, floating on the shaft 8; the pinion 26 is driven by shaft 8 through dental clutch 27 (provided with suitable release mechanism, not shown). Cable drum 28, also mounted on shaft 25, is thus supplied with power when forward motion of the entire machine is desired. A sheave 46 is preferably provided, over which the cable 29 travels to or from the cable drum. The forward motion of the grubbing machine may be secured by attaching the end of the cable to a suitable anchor, such as a tree, or a tractor which can pull out the cable and then stop and act as an anchor.

Steering of the machine may be accomplished in any suitable manner. In the arrangement shown in the drawings, the steering wheel 30 and the column 31 control, through a worm gear or other suitable means, the link 32 which, in turn, controls, through the ball-and-socket joint 33, the cross-bar 34 which is pivotally connected to the arms 35 rigidly connected to the columns 36. At the bottoms of the columns are mounted colters 37 through which steering of the machine is accomplished.

The rear of the machine is supported by rollers 38 and the front by the shoe 39 which preferably extends across the full width of the machine, with openings therein for the steering colters. As shown, the shoe is made in two sections, the upper one, 40, sloping rearwardly to discharge dirt falling thereon through the digger rack.

A baffle plate 41 is preferably mounted on the under side of the digger rack, extending downwardly toward but just clearing the grating 45 at all positions of the digger rack. This baffle plate tends, on the backward stroke of the digger rack, to force the roots back against the moldboard 23 and eventually off to the right-hand side of the machine.

In Fig. 2 the digger rack and swinging baffles are shown in two positions: near the bottom of the downward stroke in full lines, 12, 19, and fully retracted in broken lines, 12', 19'. (The baffle plate 41 is not shown in the latter position of the digger rack.) The path of the point of the digger bars, when the machine is stationary, is indicated by the dotted curve 42; this particular curve, of course, is applicable only with the specific dimensions and arrangement shown in the drawings.

Preferably, the forward speed of the machine, in feet per minute, is such, in relation to the number of strokes of the digger rack per minute, that the points of the digger bars enter the ground, on each stroke, back of the point where they emerged on the previous stroke. In this way, comparatively little power is required to force the digger rack into the ground to the maximum depth. Of course, the dimensions of the various parts, the extent of motion of the digger rack, the speed of travel of the machine, and other variable factors are to be adjusted to suit the particular type of work which the machine is to accomplish. Digging to a depth of 20 inches, with a space of 30 inches between the digger rack, in its extreme upward position, and the cross-pipe 20, is suitable for certain types of Florida soil, such as palmetto-land.

It is believed that the operation of the machine will be clear from the foregoing description thereof. Normally, the only preparation of the ground required before using my machine is to cut off the tops of all growth over three feet high. The cable 29 is then drawn out and anchored and the machine set in operation. The action should be completely automatic until the cable anchor is reached. The ground is thoroughly stirred and broken up and the roots drawn out of it by the teeth on the digger bars, deposited on the grating, and eventually on the surface of the ground, where they can be conveniently disposed of. It is obvious that, if desired, a mechanical conveyor system can be embodied in the machine upon which the roots, etc., will be deposited by the digger rack and which in turn will deposit them in a truck or other vehicle.

As the top soil is left on top and the ground left level, my invention leaves the land ready for planting without the necessity of harrowing, raking, building up the soil by cultivation, etc.

It is of course to be understood that many modifications may be made by one skilled in the art in the details and arrangement of the mechanism of the machine herein described, the machine in the form shown, however, being the preferred embodiment of my invention. I desire protection for all modifications of the form of my invention shown and described herein that come within the scope of the appended claims.

Having described my invention, I claim:

1. A grubbing machine comprising in combination a digger rack composed of a plurality of spaced, parallel digger arms provided with upstanding teeth on their leading edges; free-swinging baffles positioned adjacent the leading edges of the digger arms; means for imparting a steady forward motion to the machine; and means for forcing the digger rack downwardly into the ground, then in a forward direction, and then upward out of the ground.

2. A machine for stirring up the ground and removing roots therefrom, comprising in combination a frame; a source of power mounted thereon; a disc rotated thereby and carrying a crank pin; a digger rack composed of a plurality of spaced, parallel digger arms, each provided with a series of teeth on its leading edge; a beam associating the digger rack with the crank pin; a link pivoted at one end on said frame and pivotally connected at the other end to the beam; means for imparting a steady forward motion to the machine; free-swinging baffles normally located adjacent the leading edges of the digger arms; and a grating located behind the digger rack.

3. A grubbing machine comprising in combination a digger rack composed of a plurality of spaced digger arms having upstanding teeth on their leading edges; members rigidly affixed to said rack and extending therefrom; means associated with said members for imparting reciprocating motion to the digger rack; means associated with said members, at a point spaced from the point of association of said first-mentioned means, for limiting the tangential motion of said members; and baffles located adjacent the toothed edges of the digger arms.

4. A grubbing machine comprising in combination a digger rack composed of a plurality of spaced digger arms having upstanding teeth on their leading edges; means associated with said rack for imparting reciprocating motion thereto; a second means, also associated with said rack, for limiting the tangential motion thereof; baffles located adjacent the toothed edges of the digger arms; and means for imparting forward motion to the machine.

5. A grubbing machine comprising in combination a digger arm which is associated, adjacent one end, with a revolving crank pin; the said arm being pivotally connected, intermediate its ends, to a link which is pivotally connected to a fixed point spaced from the point of connection to the digger arm; the leading edge of the portion of the digger arm below the connection to the link being provided with upstanding teeth; a free-swinging baffle positioned adjacent the leading edge of the digger arm; and a source of power for causing said crank pin to revolve.

ROYDEN O. COUCH.